(12) United States Patent
Reid (10) Patent No.: US 8,015,099 B2
(45) Date of Patent: Sep. 6, 2011

(54) ORDER ROUTING SYSTEM AND METHOD INCORPORATING DARK POOLS

(75) Inventor: Charles Keller Reid, Dallas, TX (US)

(73) Assignee: Penson Worldwide, Inc., Dallas, TX (US)

( * ) Notice: Subject to any disclaimer, the term of this patent is extended or adjusted under 35 U.S.C. 154(b) by 731 days.

(21) Appl. No.: 12/141,417

(22) Filed: Jun. 18, 2008

(65) Prior Publication Data
US 2009/0024512 A1 Jan. 22, 2009

Related U.S. Application Data

(60) Provisional application No. 60/944,692, filed on Jun. 18, 2007.

(51) Int. Cl.
*G06Q 40/00* (2006.01)
(52) U.S. Cl. ............................................. 705/37; 705/35
(58) Field of Classification Search .................. 705/35, 705/37
See application file for complete search history.

(56) References Cited

U.S. PATENT DOCUMENTS

| | | | |
|---|---|---|---|
| 5,563,607 A | 10/1996 | Loomis et al. |
| 5,787,402 A | 7/1998 | Potter et al. |
| 5,867,488 A | 2/1999 | Derango et al. |
| 6,272,474 B1 | 8/2001 | Garcia |
| 6,643,631 B1 | 11/2003 | Heyde |
| 6,677,858 B1 | 1/2004 | Faris et al. |
| 6,735,580 B1 | 5/2004 | Li et al. |
| 6,772,132 B1 | 8/2004 | Kemp, II et al. |
| 6,772,136 B2 | 8/2004 | Kant et al. |
| 6,829,590 B1 | 12/2004 | Greener et al. |
| 6,903,681 B2 | 6/2005 | Faris et al. |
| 6,912,511 B1 | 6/2005 | Eliezer et al. |
| 6,952,683 B1 | 10/2005 | Gerhard |
| 6,957,191 B1 | 10/2005 | Belcsak et al. |
| 7,035,246 B2 | 4/2006 | Taylor |
| 7,065,500 B2 | 6/2006 | Singh et al. |

(Continued)

FOREIGN PATENT DOCUMENTS

JP 2001 125 946 5/2001

(Continued)

OTHER PUBLICATIONS

"'Dark pools' and other new-age exchanges rewrite the rules, under the radar", Marketwatch, May 14, 2007 Journal Code: WCBQ.*

(Continued)

*Primary Examiner* — Richard C Weisberger
(74) *Attorney, Agent, or Firm* — RatnerPrestia (57) ABSTRACT

A method for routing a financial instrument order incorporating dark pools and at least one electronic communication network (ECN) or exchange. The financial instrument order includes an identification of a financial instrument, a bid or ask price, and a number of units to be traded. A ping order of the dark pools is determined. The financial instrument order is routed to a top dark pool as an immediate or cancel order. If the financial instrument order is not complete, the ping order is updated by removing the top dark pool. If any dark pools remain in the updated ping order, the financial instrument order is routed to the next dark pool. This process continues until all of the dark pools have been pinged or the financial instrument order is complete. If the financial instrument order is not complete, the financial instrument order is routed to the ECN or exchange.

20 Claims, 4 Drawing Sheets

U.S. PATENT DOCUMENTS

| | | |
|---|---|---|
| 7,080,160 B2 | 7/2006 | Cognet et al. |
| 7,167,838 B1 | 1/2007 | Gatto |
| 7,174,340 B1 | 2/2007 | Molesky et al. |
| 7,177,833 B1 | 2/2007 | Marynowski et al. |
| 7,197,484 B1 | 3/2007 | Yuyama |
| 7,542,939 B2 | 6/2009 | Ferguson et al. |
| 2001/0037454 A1 | 11/2001 | Botti et al. |
| 2002/0055901 A1 | 5/2002 | Gianakouros et al. |
| 2002/0087454 A1 | 7/2002 | Calo et al. |
| 2002/0091624 A1 | 7/2002 | Glodjo et al. |
| 2002/0120837 A1 | 8/2002 | Maxemchuk et al. |
| 2002/0131370 A1 | 9/2002 | Chuah et al. |
| 2003/0041006 A1 | 2/2003 | Bunda |
| 2003/0088499 A1 | 5/2003 | Gilbert et al. |
| 2003/0149603 A1 | 8/2003 | Ferguson et al. |
| 2003/0208430 A1 | 11/2003 | Gershon |
| 2004/0098334 A1 | 5/2004 | Brusso et al. |
| 2004/0133506 A1 | 7/2004 | Glodjo et al. |
| 2005/0119964 A1 | 6/2005 | Brady et al. |
| 2007/0038523 A1 | 2/2007 | Komem et al. |
| 2007/0100722 A1 | 5/2007 | Ferguson et al. |
| 2007/0174181 A1 | 7/2007 | Brummette et al. |
| 2007/0282726 A1 | 12/2007 | Koester et al. |
| 2008/0147569 A1 | 6/2008 | Kahan et al. |

FOREIGN PATENT DOCUMENTS

| | | |
|---|---|---|
| JP | 2002 318 910 | 10/2002 |
| WO | WO 96/34357 A1 | 10/1996 |
| WO | WO 03/107121 A2 | 12/2003 |

OTHER PUBLICATIONS

Basar, Shanny, Dark liquidity pools make a splash with US traders, Financial News Online US, Apr. 25, 2007, 4 pp., DowJones, at http://www.financialnews-us.com/INDEX.CFM?PAGE=USFEATURES&CONTENTID=2347636817 (last accessed Jun. 18, 2008).

Weidner, David, The secret stock market—"Dark pools" and other new-age exchanges rewrite the rules, under the radar, MarketWatch, May 14, 2007, 6 pp., at http://www.marketwatch.com/news/story/secret-stock-market-upstart-systems/story.aspx?guid=%7b11EB6EC9-6D71-43C9-ADD2-59C6B9E3C5D1%7d&print=true&dist=printMidSection (last accessed Oct. 8, 2008).

Carol Alexander; Market Models: A Guide to Financial Data Analysis; Chapters 3-13 (John Wiley & Sons, Ltd. 2001 Chichester, New York, Weinheim, Brisbane, Singapore, Toronto).

International Search Report for International Application No. PCT/US2008/007580 mailed on Jan. 28, 2009.

International Written Opinion for International Application No. PCT/US2008/007580 mailed on Jan. 28, 2009.

* cited by examiner

ORDER ROUTING SYSTEM AND METHOD INCORPORATING DARK POOLS

CROSS REFERENCE TO RELATED APPLICATIONS

This non-provisional application claims the benefit of priority to U.S. Provisional Application No. 60/944,692, filed Jun. 18, 2007, the entire contents of which are incorporated by reference herein for all purposes.

FIELD OF THE INVENTION

The present invention concerns systems and methods for routing orders of financial instruments. In particular, these systems and methods utilize "dark pools" of liquidity in addition to traditional exchanges and electronic communication networks (ECNs) to fulfill orders. These exemplary systems and methods may improve execution quality, increase speed, and/or decrease market impact.

BACKGROUND OF THE INVENTION

Driven by the boom in electronic trading and other technological advances, a range of upstart entrepreneurs now are doing the kind of bulk trading that up until a few years ago was practiced exclusively in upstairs trading rooms at major brokerages.

These so-called alternative trading systems, which are propagating rapidly, are often known in the art as "dark pools" because of their nebulous and murky nature. Estimated to handle about 1 out 10 shares traded each day in the U.S., dark pools are meeting a need by institutions to grab or dump stocks quietly—and anonymously.

The pools are booming in popularity as big institutional investors look for ways to trade blocks of stock without triggering ripples in the share price as can happen on traditional stock markets such as the New York Stock Exchange (NYSE) and NASDAQ. In the harsh light of a public marketplace like the floor of the NYSE, an institution trying to pull off a massive trade runs the risk of making a big splash that will move the market, but in a dark pool, a big fish can jump in without so much as a ripple.

Therefore, large brokerage firms, trading boutiques and even stock exchanges are interested in designed systems that allow shares to be bought and sold in these dark pools out of the sight of prying eyes. However, due to their proliferation, the market has become so fragmented that it may be hard to find big blocks of stock or other financial instruments to trade. So many dark pools have popped up that using them has become increasingly frustrating and time-consuming for many investors. At least forty-two such U.S. trading networks now are competing for orders, up from seven dark pools as recently as 2003.

These dozens of dark pools have created a new and wild frontier that is largely unregulated. The industry is growing so fast that regulators cannot keep up. Moreover, some observers fear these private marketplaces could take too much trading volume from the public markets—putting retail investors at a disadvantage.

What is certain is that dark pools have radically altered the way big institutions trade. And because private trading networks are extremely profitable, an array of old-line Wall Street firms is following in the footsteps of independent startups that have carved out the industry's hottest new niche.

Without the easy access granted by dark pools, big institutions would have to move big orders through the market by calling a broker who would, in turn, send that market to the floor. As the information leaked—first to the broker, then to the floor—an investor's intentions would be exposed.

But in a dark pool, a big institutional investor can shop or put a buy order out for stock without alerting a regular broker. Though alternative trading systems are not water-tight, they do minimize information leakage, traders say.

There is no doubt that pension funds, mutual funds, hedge funds and many other big institutional investors are as eager as ever to buy and sell blocks of stock without pushing prices around. As a result, dark pools are expected to account for about 10% of total daily trading volume in the U.S. in 2008, up from less than 1% in 2003. Securities firms and their clients are expected to direct about 20% of their stock orders to dark pools by 2010, up from approximately 17% in 2007-08.

In a dark pool, investors indicate their interest and either negotiate with a counterparty or get matched with one by the dark pool. Many investors put up with the confusion of using the pools and the declining order sizes on some because the trades on dark pools can still be much bigger than those done on public exchanges, from a few thousand shares to tens of thousands at a time.

SUMMARY OF THE INVENTION

An exemplary embodiment of the present invention includes a method for routing a financial instrument order using a plurality of dark pools and at least one electronic communication network (ECN) or exchange. The financial instrument order has several parameters including a financial instrument, one of a bid price or an ask price, and an order number of units to be traded. The financial instrument order is placed with an automated order router adapted to route financial instrument orders to the dark pools and the at least one ECN or exchange used in the method. A ping order of the dark pools is determined. The financial instrument order is routed to a top dark pool in the ping order as an immediate or cancel (IOC) order (also known as pinging the dark pool). The order number is reduced by the filled number of units of the financial instrument that were traded with the top dark pool as a result of the IOC order. If the order number is reduced to zero, the financial instrument order is flagged as complete. If the order number is not reduced to zero, the ping order is updated by removing the top dark pool from the ping order. If the financial instrument order is not flagged as complete and the updated ping order still includes at least one dark pool, the financial instrument order is routed to the next dark pool, i.e., the new top dark pool, in the ping order. This process continues until all of the dark pools have been pinged. If the financial instrument order is still not flagged as complete after all dark pools are pinged, the remaining portion of the financial instrument order is routed to at least one ECN or exchange.

Another exemplary embodiment of the present invention includes an automated order routing system adapted to route financial instrument orders to a plurality of dark pools. The automated order routing system includes an input interface for placing financial instrument orders with the automated order routing system; a ping order processor coupled to the input interface; a dark pool router coupled to the ping order processor and the dark pools; an IOC feedback processor coupled to the dark pool router and the dark pools; and an order completion router coupled to the IOC feedback processor and at least one dark pool, ECN, or exchange. Each financial instrument order has a plurality of parameters including a financial instrument, a bid price or an ask price, and an order number of units of the financial instrument to be traded. The ping order processor is adapted to determine a ping order of the dark pools based on historic information about each of the dark pools and the financial instrument. The order router is adapted to route the financial instrument order to the plurality of dark pools one at a time in the ping order as immediate or cancel (IOC) orders until 1) the financial instrument order is flagged as completed or 2) the ping order is flagged as completed. The IOC feedback processor is adapted to receive a response to the IOC order from the most recently pinged dark pool. The IOC feedback processor reduces the order number of the financial instrument order by the number of units of the financial instrument traded with the pinged dark pool as a result of the response to the IOC order before the order router routes the financial instrument order to the next dark pool in the ping order. The IOC feedback processor also flags the financial instrument order as completed if the order number of the financial instrument order equals zero. The IOC feedback processor also removes the most recently pinged dark pool from the ping order, and flags the ping order as completed if no dark pools remain in the ping order. The order completion router is adapted to route a remaining portion of the financial instrument order to the at least one dark pool, ECN, or exchange as a limit order, if the ping order is flagged as completed.

Yet another exemplary embodiment of the present invention includes a method for routing a financial instrument order using a plurality of dark pools. The financial instrument order has several parameters including a financial instrument, one of a bid price or an ask price, and an order number of units to be traded. The financial instrument order is placed with an automated order router adapted to route financial instrument orders to the dark pools. A ping order of the dark pools is determined. The financial instrument order is routed to a top dark pool in the ping order as an immediate or cancel (IOC) order, i.e., the top dark pool is pinged. The order number is reduced by the filled number of units of the financial instrument that were traded with the top dark pool as a result of the IOC order. If the order number is reduced to zero, the financial instrument order is flagged as complete. If the order number is not reduced to zero, the ping order is updated by removing the top dark pool from the ping order. If the financial instrument order is not flagged as complete and the updated ping order still includes at least one dark pool, the financial instrument order is routed to the next dark pool, i.e., the new top dark pool, in the ping order. This process continues until all of the dark pools have been pinged. If the financial instrument order is still not flagged as complete after all dark pools are pinged, the remaining portion of the financial instrument order is routed to at least one dark pool as a limit order.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawing are the following figures.

DETAILED DESCRIPTION OF THE INVENTION

The exemplary embodiments of the present invention involve the incorporation of dark pools of liquidity in the routing of financial instrument orders. These financial instruments may include the following: stocks, bonds, commodities, currencies, equities, derivatives, options, and/or futures.

Figure 1:
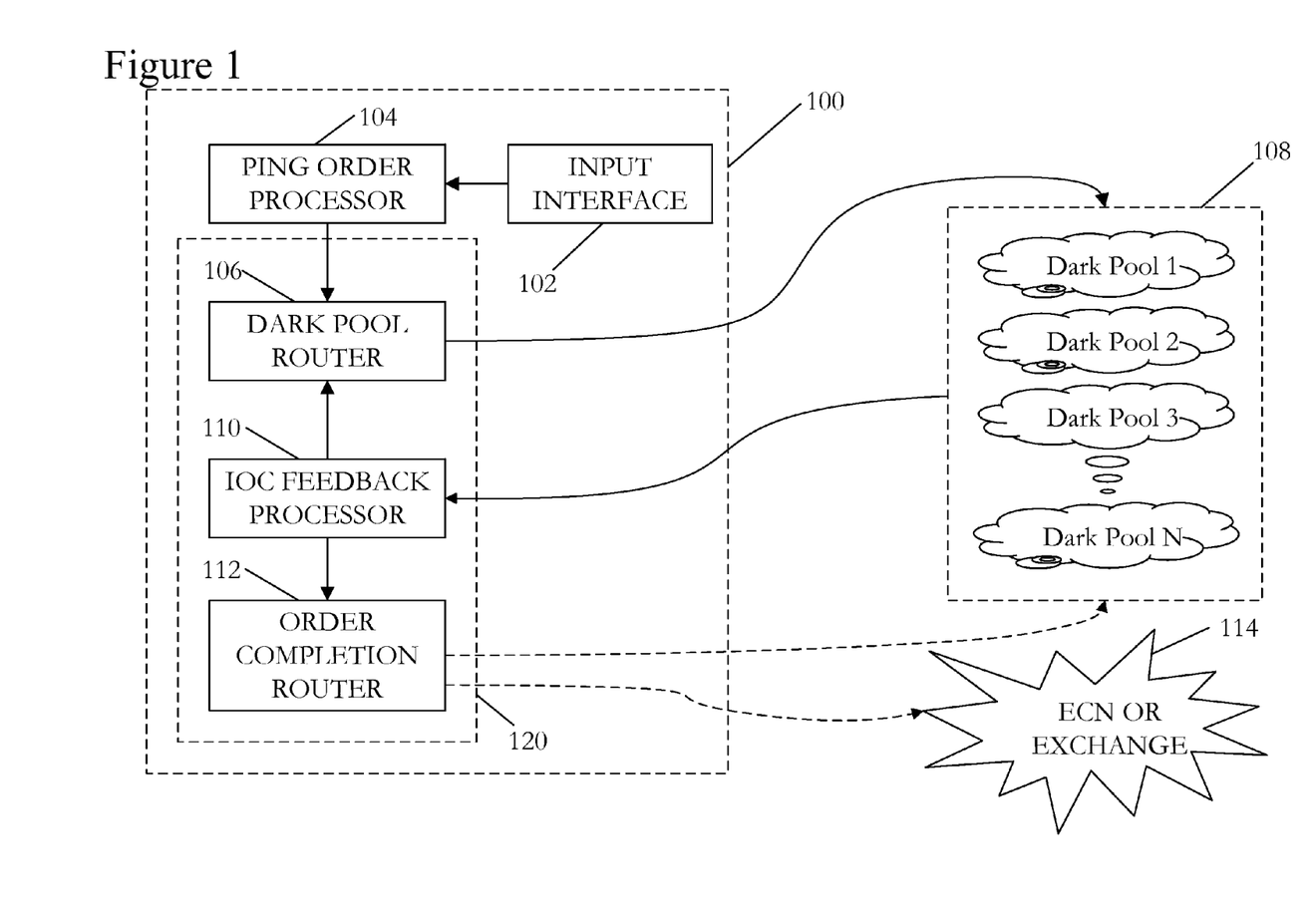
FIG. 1 is a schematic block diagram illustrating an exemplary automated order routing system for routing financial instrument orders, in accordance with an exemplary embodiment of the present invention.

FIG. 1 is a schematic block diagram illustrating exemplary automated order routing system 100 according to an exemplary embodiment of the present invention. Exemplary automated order routing system 100 is adapted to route financial instrument orders to a plurality of dark pools 108 and may also route financial instrument orders to an electronic communication network (ECN) or exchange (labeled 114 in FIG. 1).

Exemplary automated order routing system 100 includes an input interface 102 for placing financial instrument orders with automated order routing system 100; a ping order processor 104, which is coupled to input interface 102; a dark pool router 106, which is coupled to ping order processor 104 and dark pools 108; an immediate or cancel (IOC) feedback processor 110, which is coupled to dark pool router 106 and dark pools 108; and an order completion router 112, which is coupled to IOC feedback processor 110 and dark pools 108 or ECN or exchange 114. Although FIG. 1 illustrates dark pool router 106, IOC feedback processor 110, and order completion router 112 as separate modules, it is contemplated that the functionality of dark pool router 106, IOC feedback processor 110, and order completion router 112 may be combined into a single automated order router, designated in FIG. 1 as 120, in an exemplary embodiment of system 100. Any discussion below of dark pool router 106, IOC feedback processor 110, and order completion router 112 is understood to describe the functionality of automated order router 120 in embodiments of automated order routing system 100 in which automated order router 120 is present as a single module.

Input interface 102 allows a user, an automated financial instrument trading processor, etc. to place financial instrument orders with automated order routing system 100. Each financial instrument order has several parameters including the following: an identification of the financial instrument to be traded; either a bid price or an ask price for the financial instrument; and the number of units of the financial instrument to be traded (the "order number"). The financial instrument order may include other parameters known in the art, such as an execution time for the order or a cancellation time for any remaining portion of the order. Additional parameters may also be specific to a type of financial instrument. For example, a financial order for options or futures may include a parameter for the delivery date.

Input interface 102 may desirably include a display at which a user may view the financial instrument order and prompts for placing the order. The display may have a touch screen to allow the user to input the parameters of the financial instrument order. Input interface 102 may also include a keyboard, a touchpad, a mouse and/or other input device to allow the user to input the parameters of the financial instrument order.

Ping order processor 104 is adapted to determine the order of dark pools 108 to which the financial instrument order is to be routed. In other words, ping order processor 104 is adapted to determine the order in which dark pools 108 are to be pinged, i.e., the ping order. Pinging is the process by which an order is routed to and placed with one of dark pools 108.

Ping order processor 104 desirably determines the ping order based on historic information about each of dark pools 108 and the financial instrument being traded. Such historic information includes the frequency with which the particular financial instrument, or type of financial instrument, has been traded in a particular dark pool; the typical trade size of trades made in the particular dark pool; the typical trade volume of the particular dark pool; the time of most the recent trades of the financial instrument in the particular dark pool, etc.

Dark pool router 106 is adapted to route the financial instrument order to dark pools 108 one at a time according to the ping order. The financial instrument order is routed to each dark pool in order as an immediate or cancel (IOC) order until either 1) the financial instrument order is flagged as completed or 2) the ping order is flagged as completed. Flagging of the financial instrument order and/or the ping order as completed is discussed in further detail below.

IOC feedback processor 110 is adapted to perform several tasks. After each IOC order is routed by dark pool router 106, IOC feedback processor 110 receives a response to the IOC order from the most recently pinged dark pool. This response includes information about how many units of the financial instrument were traded with the pinged dark pool as a result of the IOC order (the "filled number") and may also include other information, such as the price at which these units were traded. IOC feedback processor 110 then reduces the order number of the financial instrument order by the filled number before dark pool router 106 routes the financial instrument order to the next dark pool in the ping order. IOC feedback processor 110 removes the most recently pinged dark pool from the ping order, and if no dark pools remain in the ping order, it flags the ping order as completed. If the order number of the financial instrument order equals zero, IOC feedback processor 110 also flags the financial instrument order as completed.

Order completion router 112 is adapted to route the remaining portion of the financial instrument order to at least one of dark pools 108 or ECN or exchange 114 as a limit order, if the ping order is flagged as completed but the financial instrument order is not. Typically, order completion router 112 routes the remaining portion of the financial instrument order to only one dark pool, ECN, or exchange as a limit order; however, in some cases if may be desirable to split the remaining order between several destinations as several limit orders. The limit order(s) may be routed by order completion router 112 with a cancellation time, when the order is to be canceled if it has not been filled.

The financial information exchange (FIX) protocol is a protocol commonly used for transmitting financial instruments orders by many ECN and exchanges. Many dark pools may use the FIX protocol as well. Thus, exemplary automated order routing system 100 may also desirably include a FIX processor (not shown) that is adapted to convert the financial instrument order into a FIX protocol compatible format. The FIX processor is coupled to input interface 102 and one or both of dark pool router 106 and order completion router 112.

In the present application, a marketable financial instrument order is one for which any units of the financial instrument order may be filled by quotes already posted to an ECN or exchange. For example, if the financial instrument order is a buy order for 2000 shares of a particular stock at $10.05 and there are any ask quotes (offers) for $10.05 or less posted to the ECN or exchange, then the financial instrument order is marketable, even if fewer than 2000 shares of the stock are currently quoted at $10.05 or less. A financial instrument order would be immediately fillable if all of the units in the order may be filled by quotes already posted to an ECN or exchange. In the previous example, the financial instrument order would be immediately fillable if ask quotes totaling at least 2000 shares of the stock for $10.05 or less were posted on the ECN or exchange.

In some jurisdictions, there may be regulatory issues involving the use of dark pools for financial instrument orders that are unmarketable. Therefore, exemplary automated order routing system 100 may also desirably include a quote comparison processor (not shown) coupled to input interface 102, the ping order processor 104, and at least one ECN or exchange 114. The quote comparison processor compares the bid price or ask price of the financial instrument order to current quotes of the financial instrument on at least one ECN or exchange to determine whether the financial instrument order is marketable. If the financial instrument order is determined to be marketable by the quote comparison processor, the quote comparison processor then passes the financial instrument order to ping order processor 104. Otherwise, the quote comparison processor flags the ping order as completed and passes the financial instrument order to order completion router 112 for completion as a limit order via at least one of dark pools 108 or ECN or exchange 114.

The quote comparison processor may also determine whether the financial instrument order is immediately fillable. If the financial instrument order is determined to be immediately fillable by the quote comparison processor, it may be desirable for the quote comparison processor to flag the ping order as completed and pass the financial instrument order to order completion router 112 so that the order may be immediately filled on ECN or exchange 114. However, in some cases it may not be desirable to route the financial instrument order to ECN or exchange 114 even if it is immediately fillable. In such cases, the quote comparison processor may desirably pass the financial instrument order to ping order processor 104, without flagging the ping order as completed.

Ping order processor 104, dark pool router 106, IOC feedback processor 110, and order completion router 112 may be separate modules or may be embodied in one or more combined modules. For example, as mentioned above, dark pool router 106, IOC feedback processor 110, and order completion router 112 may be embodied as a single automated order router 120 in an exemplary embodiment of automated order routing system 100. These modules (modules 104, 106, 110, and 112) may include special purpose circuitry, one or more application specific integrated circuits (ASICs), and/or a general purpose computer that has been programmed with software instructions to perform operations of the module. Input interface 102 may also be integrated into one of these modules. If included, the FIX processor and/or quote comparison processor may be integrated into these modules as well.

Figure 2:
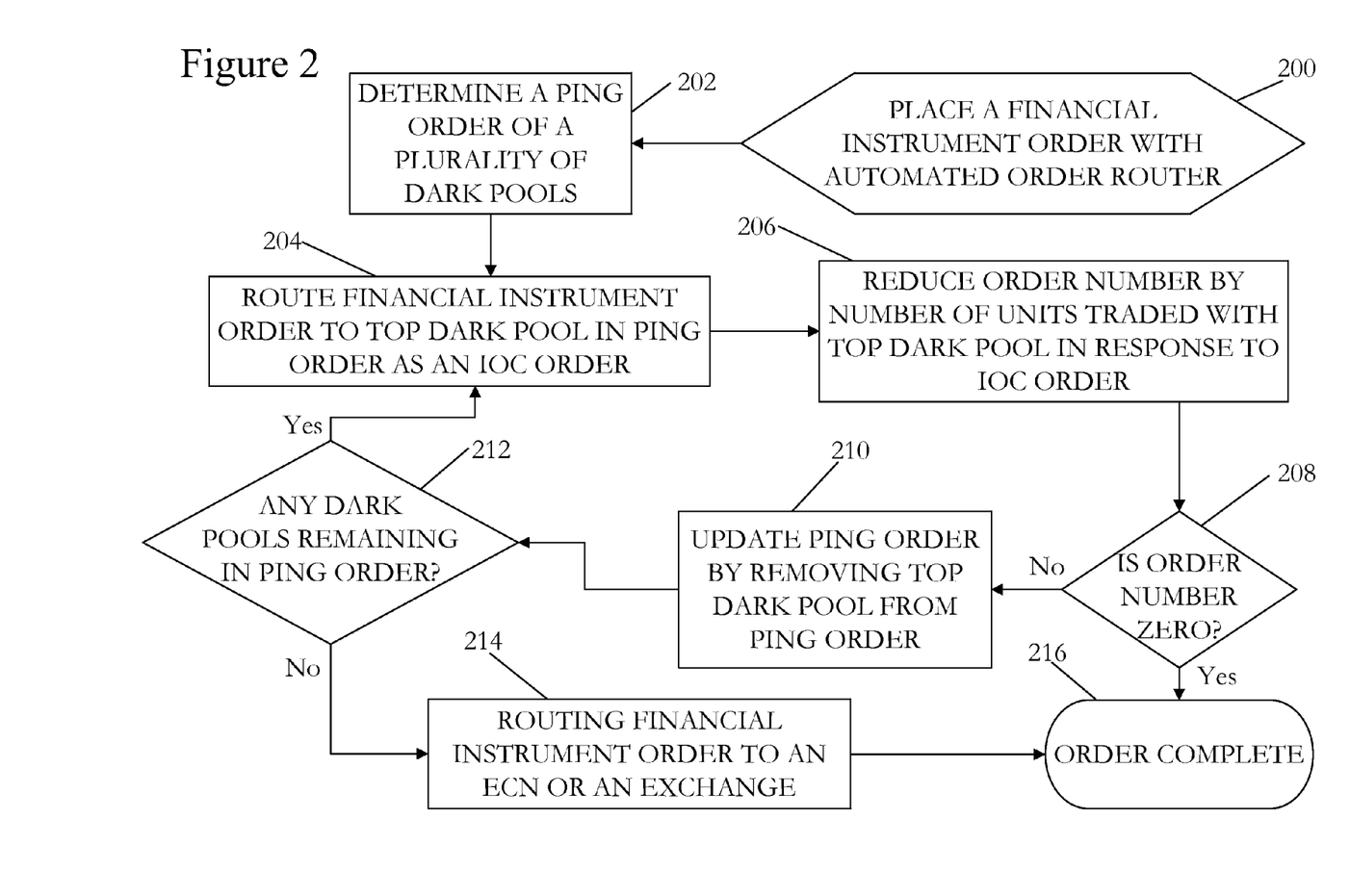
FIG. 2 is a flowchart illustrating an exemplary method for routing financial instrument orders, in accordance with an exemplary embodiment of the present invention.

FIG. 2 illustrates an exemplary method for routing a financial instrument order incorporating a plurality of dark pools and at least one ECN or exchange according to an exemplary embodiment of the present invention. The financial instrument order may have several parameters including an identification of the financial instrument, either a bid price or an ask price, and an order number of units to be traded. Once the financial instrument order has been placed by the client, this exemplary method automatically searches through the dark pools to fill as much of the order as the dark pools have immediately available. Any remaining portion of the order is then posted to one or more ECNs and/or exchanges. This exemplary method may allow the financial instrument order to be filled with improved execution quality, increased speed, and/or decreased market impact.

The financial instrument order is placed with an automated order router adapted to route financial instrument orders to the plurality of dark pools and the ECN or exchange, step 200. The automated order router may desirably be similar in functionality to the exemplary automated order router 120 of FIG. 1. A user interface coupled to the automated order router may be used to receive the identification of the financial instrument, the bid price or ask price, the order number, and any other parameters of the financial instrument order.

After the financial instrument order has been placed with the automated order router, the bid price or ask price of the financial instrument order may be compared to current quotes of the financial instrument on at least one ECN or exchange to determine whether the financial instrument order is marketable. As discussed above with reference to FIG. 1, in some jurisdictions there may be regulatory issues with routing certain unmarketable financial instrument orders to dark pools. Therefore, if the financial instrument order is determined to be unmarketable, it may be desirable to route the financial instrument order to an ECN or exchange, rather than using the dark pools.

Further the bid price or ask price of the financial instrument order and the order number may be compared to the current quotes of the financial instrument on at least one ECN or exchange to determine whether the financial instrument order is immediately fillable. If the financial instrument order is determined to be immediately fillable, it may be desirable to route the financial instrument order to the ECN(s) and/or exchange(s) to be immediately filled; however, in some cases, it may still be desirable to ping the dark pools first, either to at least partially mask the size of the financial instrument order or in hopes of possible price improvement.

A ping order of the dark pools in the plurality of dark pools is determined, step 202. The ping order is desirably determined based on historic information about each dark pool and the financial instrument to be traded. The historic information about the dark pool may be used to determine what type(s) of financial instruments are traded in that particular dark pool, as well as assisting in determining a likelihood that a specific financial instrument (e.g., shares of Microsoft stock) may be active in the dark pool.

The financial instrument order is routed to the top dark pool in the ping order as an IOC order, step 204. This is known as pinging the dark pool.

It may be desirable to determine if the top dark pool in the ping order supports the FIX protocol before routing the IOC order. If the top dark pool does support the FIX protocol, the financial instrument order may be converted into a FIX protocol compatible format and transmitted to the top dark pool in the ping order as a FIX compatible financial instrument order. If the top dark pool does not support the FIX protocol, the financial instrument order is transmitted to the top dark pool in the ping order in the desired protocol for the dark pool.

The pinged dark pool then fills as many units of the financial instrument order as possible, based on the availability of the financial instrument at the desired bid or ask price. The automated order router desirably receives a response to the IOC order from the top dark pool. This response may desirably include the number of units traded with the dark pool and the trade price. The order number is reduced by the number of units of the financial instrument that were traded with the top dark pool (i.e., the "filled number") in response to the IOC order, step 206.

Then it is determined whether the order has been filled, step 208. If the order number is reduced to zero (i.e., the order is filled), the financial instrument order is flagged as complete, step 216; however, if the order number is not reduced to zero, the ping order is updated by removing the top dark pool from the ping order, step 210. The next dark pool in the ping order becomes the new top dark pool.

If the financial instrument order is not flagged as complete, the updated ping order is checked to determine if it still includes at least one dark pool, step 212. If the ping order does still include at least one dark pool, the financial instrument order is routed to the new top dark pool in the ping order, step 204, and as much of the financial instrument order as possible is filled. The order number is reduced by the filled number, step 206, and the order is checked to determine whether it is filled, step 208. This process continues until all of the dark pools have been pinged.

If the financial instrument order is still not complete when it is determined in step 212 that there are no remaining dark pools in the ping order, the financial instrument order is routed to at least one ECN or exchange, step 214. The remaining financial instrument order may be routed to the ECN(s) and/or exchange(s) as a limit order, an IOC order, or other type of order depending on the wishes of the client. The financial instrument order is then complete, step 216.

It is contemplated that a client may only desire the immediately fillable portion of the remaining financial instrument order be routed to the ECN(s) and/or exchange(s). In such a case at step 214, when the financial instrument order is not flagged as complete and no dark pools remain in the updated ping order, the bid price or ask price of the financial instrument order may be compared to current quotes of the financial instrument on the ECN(s) and/or exchange(s). The number of units of the financial instrument order that are immediately fillable on each of the ECN(s) and/or exchange(s) is determined. If the remaining portion of financial instrument order is not immediately fillable, only the immediately fillable portion of the financial instrument order is routed to the ECN(s) and/or exchange(s) as a limit order.

However, if the remaining portion of financial instrument order is immediately fillable, at least some of the desired units of the financial instrument may be available for a better price than the bid price or ask price of the financial instrument order. Therefore, it may be desirable to calculate a best available composite price for the remaining portion of the financial instrument order on the ECN(s) and/or exchange(s) based on the current quotes of the financial instrument on the ECN(s) and/or exchange(s). The number of units of the financial instrument to be traded at each ECN or exchange to obtain this best available composite price may then be identified. A sub-portion of the remaining portion of the financial instrument order may then be routed to each ECN or exchange. Each of these sub-portions of the remaining portion of the financial instrument order may desirably be a market limit order for the identified number of units of the financial instrument for the corresponding ECN or exchange.

For example, if the remaining portion of the financial instrument is for 500 units of the financial instrument at a bid price of $10.05, exchange A has offers for 200 units of the financial instrument at $10.04 and 500 units at $10.05, and exchange B has offers for 100 units of the financial instrument at $10.03 and 100 units at $10.04, the best available composite price for the 500 units of the financial instrument on exchanges A and B would be $10.04 (100 units at $10.03 from exchange B, plus 200 units at $10.04 from exchange A and 100 units at $10.04 from exchange B, plus 100 units at $10.05 from exchange A). A market limit order for 300 units of the financial instrument would be routed to exchange A and a market limit order for 200 units of the financial instrument would be routed to exchange B.

It is noted that the remaining portion of the financial instrument order may desirably be converted into a FIX protocol compatible format before being transmitted to the ECN(s) and/or exchange(s).

As noted above there may be reasons making it undesirable to use dark pools to place certain unmarketable orders. In such cases, it may be desirable to determine whether the financial instrument order is marketable before pinging the dark pools. The bid or ask price of the financial instrument order may be compared to current quotes of the financial instrument on ECNs or exchanges to determine whether the financial instrument order is marketable. If the financial instrument order is determined to be marketable, then the exemplary method of FIG. 2 may be used, otherwise the financial instrument order may be routed to at least one ECN or exchange. Exemplary embodiments of the present invention may desirably include this feature, which may be utilized to ensure regulatory compliance.

Figure 3:
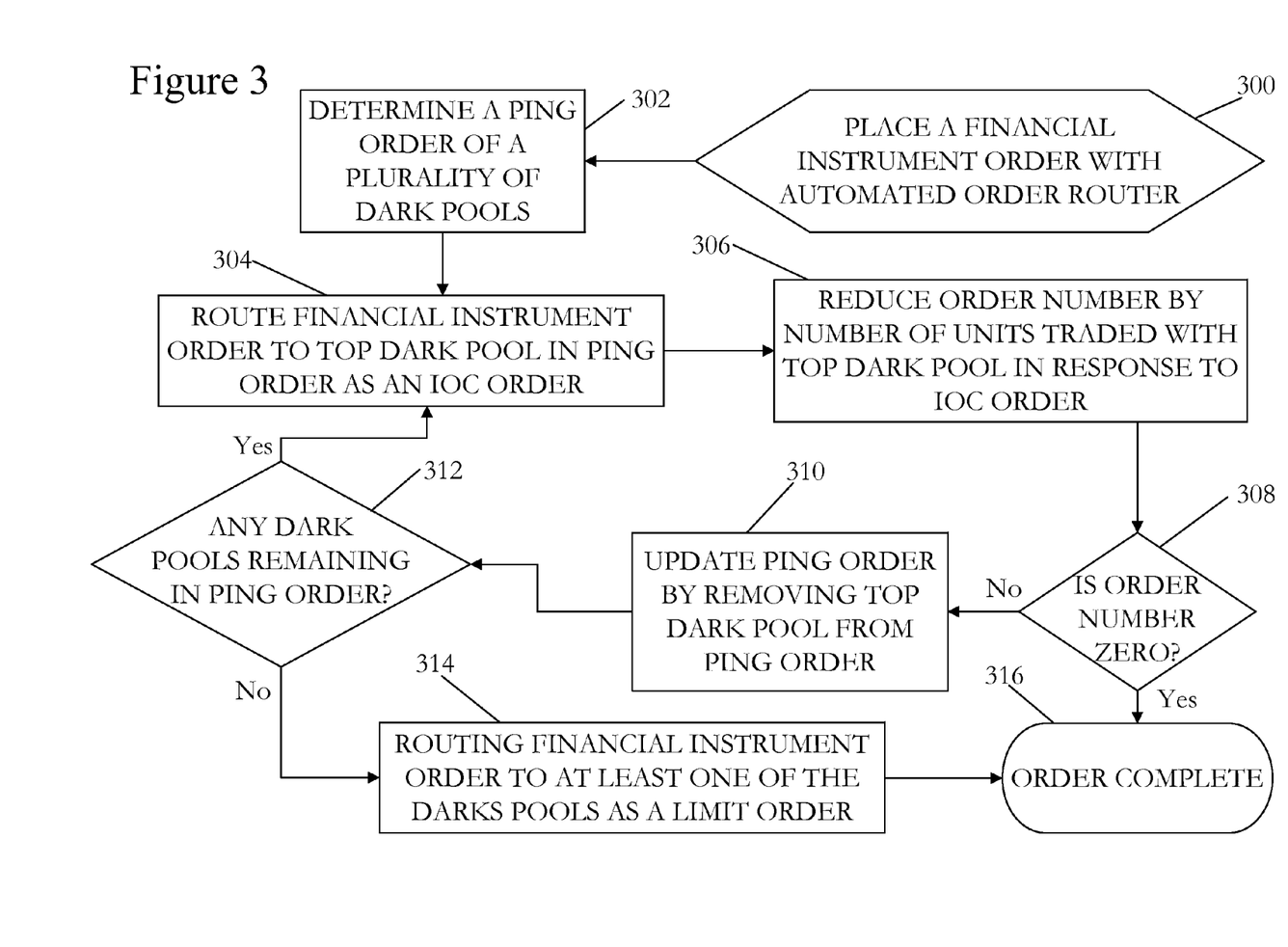
FIG. 3 is a flowchart illustrating another exemplary method for routing financial instrument orders, in accordance with an exemplary embodiment of the present invention.

FIG. 3 illustrates an exemplary method for routing a financial instrument order incorporating a plurality of dark pools according to an exemplary embodiment of the present invention. The exemplary method of FIG. 3 is similar to the exemplary method of FIG. 2, except that the exemplary method of FIG. 3 does not include routing the financial instrument order to an ECN or exchange after the ping order has been flagged as completed. Although this exemplary method may increase the time required to completely fill some financial instrument orders, it allows the client the opportunity to fill the financial instrument order without disclosing any portion of the order on an open trading system, such as an ECN or exchange.

The financial instrument order is placed with an automated order router adapted to route financial instrument orders to the plurality of dark pools, step 300. A ping order of the dark pools is determined, step 302. The ping order may be desirably determined based on historic information about each of the dark pools and the financial instrument.

The financial instrument order is routed to the top dark pool in the ping order as an IOC order, step 304, and the order number of the financial instrument order is reduced by the filled number of units of the financial instrument traded with the top dark pool as a result of the IOC order, step 306. It is determined whether the order number has been reduced to zero, step 308, and the financial instrument order is flagged as complete, step 316, if the order number is zero.

If the order number is not zero, the ping order is updated by removing the top dark pool from the ping order, step 310. It is then determined whether any dark pools remain in the ping order, step 312. If the financial instrument order is not flagged as complete and it is determined in step 312 that the updated ping order includes at least one dark pool, steps 304, 306, 308, and 312 are repeated using the new top dark pool in the ping order.

If the financial instrument order is not flagged as complete and it is determined in step 312 that no dark pools remain in the updated ping order, the remaining portion of the financial instrument order is routed to at least one of the dark pools as a limit order, step 314, and the order is flagged as complete, step 316. The limit order(s) for the remaining portion of the financial instrument order may be left on the dark pool(s) until filled or may be valid only for a predetermined time period, depending on the instructions of the client.

Figure 4:
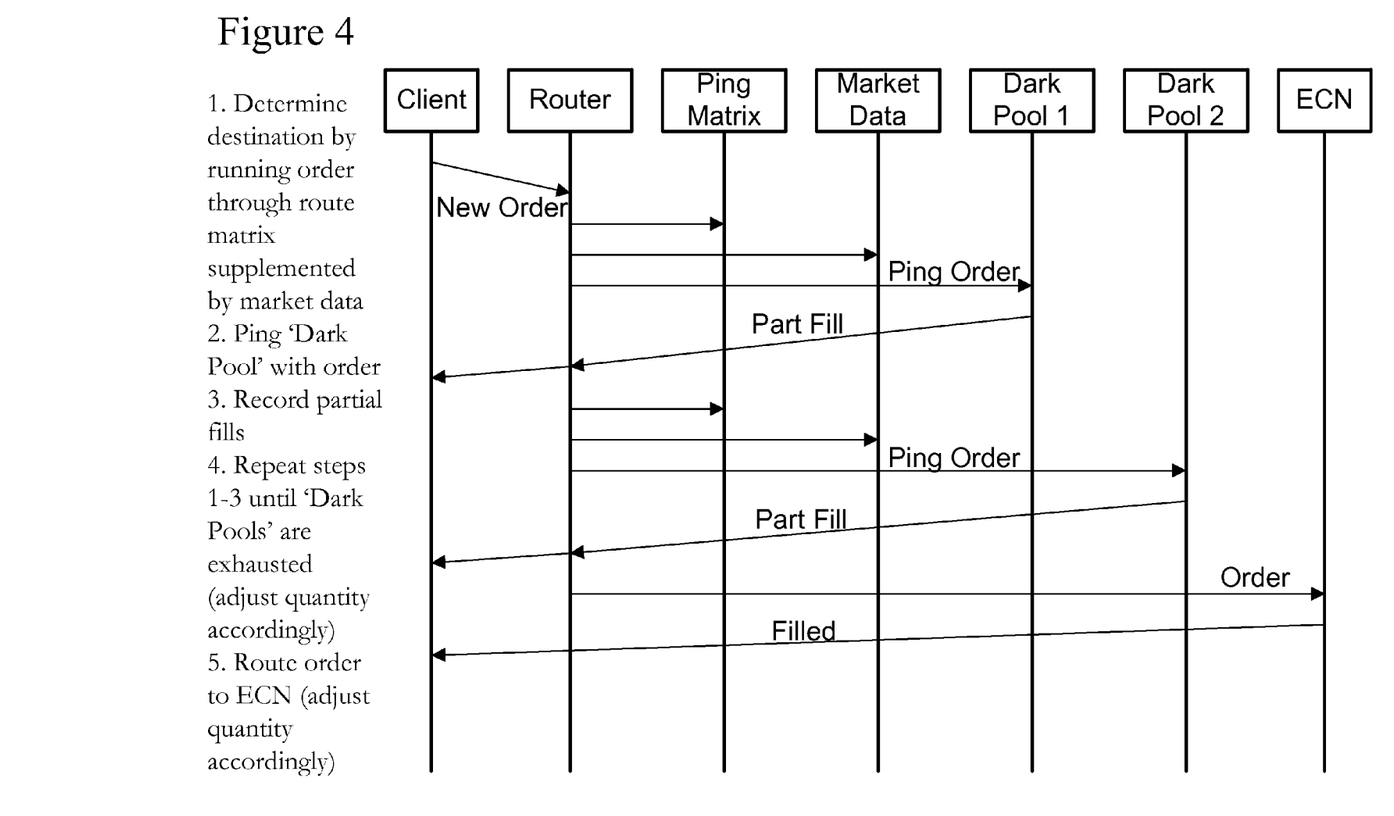
FIG. 4 is a schematic drawing illustrating an exemplary method for routing financial instrument orders, in accordance with an exemplary embodiment of the present invention.

FIG. 4 is a schematic diagram that also illustrates exemplary methods of the present invention.

The present invention includes a number of exemplary apparatus and methods. Although the invention is illustrated and described herein with reference to specific embodiments, it is not intended to be limited to the details shown. Rather, various modifications may be made in the details within the scope and range of equivalents of the claims and without departing from the invention.

What is claimed:

1. A method for routing a financial instrument order to a plurality of dark pools and at least one electronic communication network (ECN) or exchange, the financial instrument order having a plurality of parameters including an identification of a financial instrument to be traded, one of a bid price or an ask price, and an order number of units of the financial instrument to be traded by the financial instrument order, the method comprising the steps of:
   a) placing the financial instrument order with an automated order router adapted to route financial instrument orders to the plurality of dark pools and the at least one ECN or exchange;
   b) determining a ping order of the dark pools;
   c) routing the financial instrument order to a top dark pool in the ping order as an immediate or cancel (IOC) order;
   d) reducing the order number of the financial instrument order by a filled number of units of the financial instrument traded with the top dark pool as a result of the IOC order routed in step (c);
   e) i) if the order number is zero, flagging the financial instrument order as complete; or
      ii) if the order number is not zero, updating the ping order by removing the top dark pool from the ping order;
   f) if the financial instrument order is not flagged as complete and the updated ping order includes at least one dark pool, repeating steps (c), (d), (e), and (f); and
   g) if the financial instrument order is not flagged as complete and no dark pools remain in the updated ping order, routing a remaining portion of the financial instrument order to the at least one ECN or exchange.

2. A method according to claim 1, wherein the financial instrument is one of a stock, a bond, a commodity, a currency, an equity, a derivative security, or a future.

3. A method according to claim 1, wherein step (a) includes the steps of:
   a1) placing the financial instrument order with the automated order router;
   a2) comparing the one bid price or ask price of the financial instrument order to current quotes of the financial instrument on the at least one ECN or exchange to determine whether the financial instrument order is marketable; and
   a3) if the financial instrument order is determined to be marketable in step (a2), continuing to step (b), otherwise, routing the financial instrument order to the at least one ECN or exchange.

4. A method according to claim 3, wherein step (a3) includes the steps of:
   comparing the one bid price or ask price of the financial instrument order and the order number of the financial instrument order to the current quotes of the financial instrument on the at least one ECN or exchange to determine whether the financial instrument order is immediately fillable;

if the financial instrument order is determined to be immediately fillable, routing the financial instrument order to the at least one ECN or exchange; and if the financial instrument order is determined to be marketable in step (a2), continuing to step (b), otherwise routing the financial instrument order to the at least one ECN or exchange.

5. A method according to claim 1, wherein:
the automated order router is coupled to a user interface; and
step (a) includes receiving the plurality of parameters of the financial instrument order via the user interface.

6. A method according to claim 1, wherein the ping order is determined in step (b) based on historic information about each of the plurality of dark pools and the financial instrument.

7. A method according to claim 1, wherein step (c) includes the steps of:
c1) determining whether the top dark pool in the ping order supports a financial information exchange (FIX) protocol; and
c2) if the top dark pool in the ping order supports the FIX protocol, (i) converting the financial instrument order into a FIX protocol compatible format and transmitting the FIX compatible financial instrument order to the top dark pool in the ping order, otherwise, (ii) transmitting the financial instrument order to the top dark pool in the ping order.

8. A method according to claim 1, wherein step (d) includes the steps of:
d1) receiving a response to the IOC order from the top dark pool, the response indicating the filled number of units of the financial instrument traded with the top dark pool; and
d2) reducing the order number of the financial instrument order by the filled number.

9. A method according to claim 1, wherein step (g) includes the step of:
g1) if the financial instrument order is not flagged as complete and no dark pools remain in the updated ping order, converting the remaining portion of the financial instrument order into a financial information exchange (FIX) protocol compatible format and transmitting the FIX compatible financial instrument order to the at least one ECN or exchange.

10. A method according to claim 1, wherein step (g) includes the step of
g1) if the financial instrument order is not flagged as complete and no dark pools remain in the updated ping order, routing the remaining portion of financial instrument order to the at least one ECN or exchange as one of a limit order or an IOC order.

11. A method according to claim 1, wherein step (g) includes the steps of:
g1) if the financial instrument order is not flagged as complete and no dark pools remain in the updated ping order, comparing the one bid price or ask price of the financial instrument order to current quotes of the financial instrument on the at least one ECN or exchange to determine how many units of the financial instrument order are immediately fillable on each of the at least one ECN or exchange;
g2) if the remaining portion of the financial instrument order is not immediately fillable, for each of the at least one ECN or exchange, routing only an immediately fillable portion of the remaining portion of the financial instrument order to the at least one ECN or exchange as a limit order; and
g3) if the remaining portion of the financial instrument order is immediately fillable:
calculating a best available composite price for the remaining portion of the financial instrument order on the at least one ECN or exchange based on the current quotes of the financial instrument on the at least one ECN or exchange;
for each of the at least one ECN or exchange, identifying a number of units of the financial instrument to be traded at a corresponding one of the at least one ECN or exchange to obtain the best available composite price;
routing a sub-portion of the remaining portion of the financial instrument order to the corresponding one of the at least one ECN or exchange, each sub-portion of the remaining portion of the financial instrument order being a market limit order for the identified number of units of the financial instrument for the corresponding one of the at least one ECN or exchange.

12. An automated order routing system adapted to a route financial instrument order to a plurality of dark pools and an electronic communication network (ECN) or an exchange, the automated order routing system comprising:
an input interface for placing the financial instrument order with the automated order routing system, the financial instrument order having a plurality of parameters including:
an identification of a financial instrument;
one of a bid price or an ask price; and
an order number of units of the financial instrument to be traded by the financial instrument order;
a ping order processor coupled to the input interface, the ping order processor adapted to determine a ping order of the dark pools based on historic information about each of the plurality of dark pools and the financial instrument;
a dark pool router coupled to the ping order processor and the plurality of dark pools, the order router adapted to route the financial instrument order to the plurality of dark pools one at a time in the ping order as immediate or cancel (IOC) orders until the financial instrument order is flagged as completed or the ping order is flagged as completed;
an IOC feedback processor coupled to the dark pool router and the plurality of dark pools, the IOC feedback processor adapted to:
receive a response to the IOC order from a most recently pinged dark pool,
reduce the order number of the financial instrument order by a filled number of units of the financial instrument traded with the pinged dark pool as a result of the IOC,
flag the financial instrument order as completed, if the order number of the financial instrument order equals zero,
remove the most recently pinged dark pool from the ping order, and
flag the ping order as completed, if no dark pools remain in the ping order; and
an order completion router coupled to the IOC feedback processor and the plurality of dark pools and the ECN or exchange, the order completion router adapted to route a remaining portion of the financial instrument order to one of the plurality of dark pools or to the ECN or exchange as a limit order, if the ping order is flagged as completed.

13. An automated order routing system according to claim 12, wherein the financial instrument is one of a stock, a bond, a commodity, a currency, an equity, a derivative security, or a future.

14. An automated order routing system according to claim 12, wherein the input interface includes a display and at least one of a keyboard, a touchpad, a mouse, or a touch screen.

15. An automated order routing system according to claim 12, wherein:
   the ping order processor includes at least one of special purpose circuitry, an application specific integrated circuit (ASIC), or a general purpose computer;
   the dark pool router includes at least one of special purpose circuitry, an ASIC, or a general purpose computer;
   the IOC feedback processor includes at least one of special purpose circuitry, an ASIC, or a general purpose computer; and
   the order completion router includes at least one of special purpose circuitry, an ASIC, or a general purpose computer.

16. An automated order routing system according to claim 12, further comprising a financial information exchange (FIX) processor adapted to convert the financial instrument order into a FIX protocol compatible format, the FIX processor coupled to the input interface and at least one of the dark pool router or the order completion router.

17. An automated order routing system according to claim 12, further comprising a quote comparison processor adapted to compare the one bid price or ask price of the financial instrument order to current quotes of the financial instrument on the ECN or exchange to determine whether the financial instrument order is marketable, wherein:
   if the financial instrument order is determined to be marketable by the quote comparison processor, passing the financial instrument order to the ping order processor, otherwise, flagging the ping order as completed and passing the financial instrument order to the order completion router.

18. An automated order routing system according to claim 17, wherein
   the quote comparison processor further compares the one bid price or ask price of the financial instrument order and the order number of the financial instrument order to the current quotes of the financial instrument on the ECN or exchange to determine whether the financial instrument order is immediately fillable; and
   if the financial instrument order is determined to be immediately fillable by the quote comparison processor, flagging the ping order as completed and passing the financial instrument order to the order completion router.

19. A method for routing a financial instrument order incorporating a plurality of dark pools, the financial instrument order having a plurality of parameters including an identification of a financial instrument, one of a bid price, or an ask price, and an order number of units of the financial instrument to be traded by the financial instrument order, the method comprising the steps of:
   a) placing the financial instrument order with an automated order router adapted to route financial instrument orders to the plurality of dark pools;
   b) determining a ping order of the dark pools in the plurality of dark pools;
   c) routing the financial instrument order to a top dark pool in the ping order as an immediate or cancel (IOC) order;
   d) reducing the order number of the financial instrument order by a filled number of units of the financial instrument traded with the top dark pool as a result of the IOC order routed in step (c);
   e) updating the ping order by removing the top dark pool from the ping order;
   f) if the financial instrument order is not complete and the updated ping order includes at least one dark pool, repeating steps (c), (d), (e), and (f).

20. A method according to claim 19, further comprising a step of:
   g) if the financial instrument order is complete and no dark pools remain in the updated ping order, routing a remaining portion of the financial instrument order to at least one of the plurality of dark pools as a limit order.

* * * * *

UNITED STATES PATENT AND TRADEMARK OFFICE
CERTIFICATE OF CORRECTION

| | | |
|---|---|---|
| PATENT NO. | : 8,015,099 B2 | Page 1 of 1 |
| APPLICATION NO. | : 12/141417 | |
| DATED | : September 6, 2011 | |
| INVENTOR(S) | : Charles Keller Reid | |

It is certified that error appears in the above-identified patent and that said Letters Patent is hereby corrected as shown below:

On the Title page, Item [56], References Cited,

FOREIGN PATENT DOCUMENTS

"JP 2001 125946 5/2001" should read --JP 2001 125964 5/2001--

Signed and Sealed this
Thirteenth Day of December, 2011

David J. Kappos
*Director of the United States Patent and Trademark Office*